May 8, 1951 R. W. SCHLEICHER 2,552,219
DIE LIFTING HOOK
Filed May 18, 1948

INVENTOR.
Robert W. Schleicher
BY
Richard G. Parsons
ATTORNEY.

Patented May 8, 1951

2,552,219

UNITED STATES PATENT OFFICE 2,552,219

DIE LIFTING HOOK

Robert W. Schleicher, East Lansing, Mich.

Application May 18, 1948, Serial No. 27,792

2 Claims. (Cl. 294—82)

This invention relates to hooks for attaching dies to a crane by which the dies may be lifted and moved from place to place.

Dies for cutting and forming sheet metal and the like are frequently large and heavy, necessitating moving them by means of a crane. Such dies are usually provided with tapped apertures to receive die hooks or eye bolts at the corners, to which slings may be attached to be picked up by the crane hooks. No provision is made for universal movement between the die hooks and the dies, so that the die hooks are frequently bent or otherwise damaged, making them difficult to remove from the dies, as well as requiring frequent replacement.

The present invention has for its principal object the elimination of such difficulties.

A further object is to provide a rugged die hook which can be easily attached to or removed from a die without the use of special tools.

A still further object is to provide a die hook which is readily adaptable to different types of dies.

These objects, and others ancillary thereto, will more fully appear in the following specification, when read in connection with the accompanying drawings, wherein.

Figure 1:
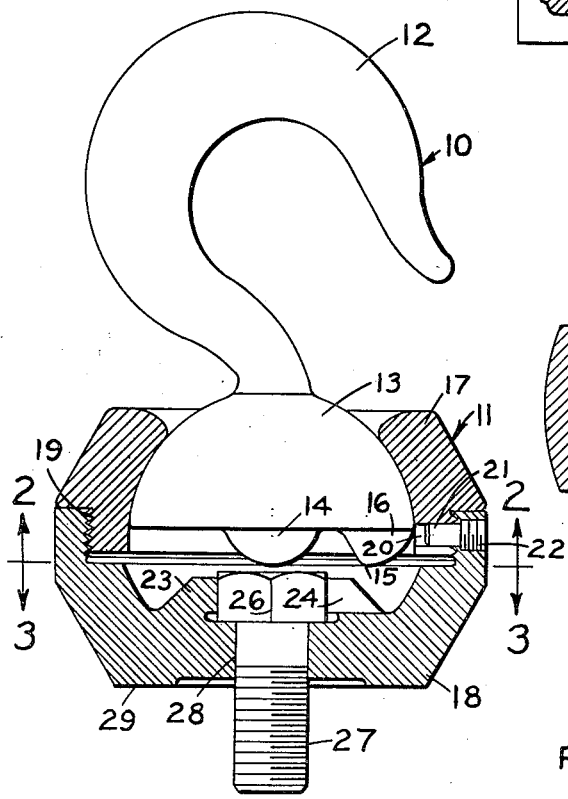
Figure 1 is a cross-sectional view of a die hook embodying the invention.
Figure 2:
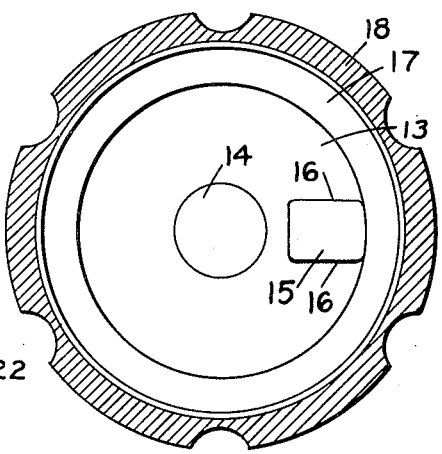
Figure 2 is a cross-sectional view taken on substantially the line 2—2 of Figure 1, looking in the direction of the arrows.

In general, the hook comprises a hook member 10 and a ball housing 11. The hook member is preferably a one piece steel forging having a hook end 12 and a ball end 13. The ball end is substantially a hemisphere, provided on its bottom surface with a spacing boss 14 and a lug 15. The boss 14 is preferably substantially a hemisphere. The lug 15 is shaped to the cross-section shown in Figure 1. It has two upright parallel plane surfaces 16, as shown in Figure 2. The purposes of the boss 14 and lug 15 will appear presently.

The ball housing 11 is composed of two sections 17 and 18. The section 17 is an annular steel forging having a spherical internal surface forming a socket to receive the ball end 13 of the hook member 10, as shown in Figure 1. The section 17 is threaded at 19. It is also provided with a radial aperture 20 to receive a set screw 21.

The section 18 is preferably a steel forging of dish shaped cross-section. The inner surface of the rim of the section 18 is threaded to mate with threads 19 whereby the two sections may be screwed together. A threaded aperture 22, which coincides with aperture 20 when the parts are screwed together receives the threaded head end of the set screw 21 to lock the two sections together.

In the center of the inner surface of the section 18 is a boss 23. The boss is formed to provide one or more (preferably three) recesses 24, which are wide enough to receive the lug 15 on the hook member 10. In the center of the boss is a socket 25 of non-circular form. Preferably the socket 25 is of hexagonal shape to receive the head 26 of a bolt or cap screw 27 in such a way that the head will not rotate in the socket.

Aligned with the socket 25 is an aperture 28 extending through the bottom wall of the section 18 to receive the shank of the cap screw 27.

The outer bottom face of the section 18 is machined as at 29 perpendicular to the axis of the cap screw 27. This surface may be completely flat or it may be relieved at the center, as shown in Figure 1.

Figure 3:
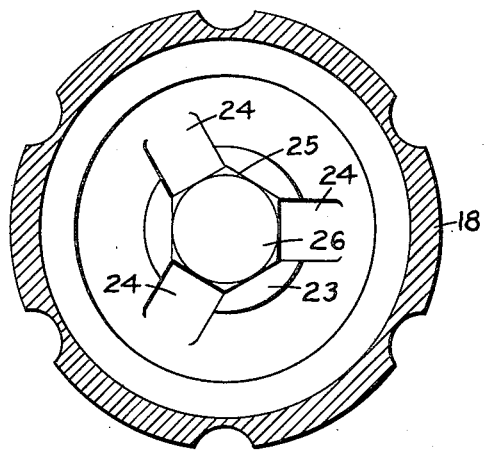
Figure 3 is a cross-sectional view taken on the line 3—3 of Figure 1, looking in the direction of the arrows.
Figure 4:
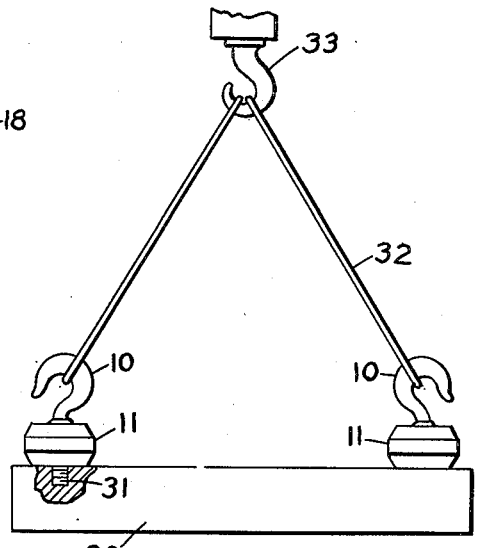
Figure 4 is an elevational view, illustrating how the hook is used in lifting a die or other article.

When using the invention to lift a die, usually four hooks are employed. Two of them are shown in Figure 4, wherein the die is designated by the numeral 30. The die is provided, preferably adjacent its corners, with tapped openings 31. The hooks are provided with cap screws of a size to fit the tapped openings 31 and each hook is assembled as shown in Figure 1. The hook member is then rocked (in a clock-wise direction as shown in Figure 1) so that the lug 15 on the ball end of the hook member is received in one of the recesses 24 on the boss 23. The cap screw 27 is started in an aperture 31 in the die 30, and using the hook as a lever the cap screw is screwed home until the surface 29 solidly engages the adjacent surface of the die. The hook can be used as a lever because of the interengagement of the lug 15 with the recess 24, and the head 26 of the cap screw with the side walls of the recess 25.

After all the hooks are attached to the die, cable or chain slings 32 are looped under the hook members 10 and over a crane hook 33 hanging from a crane or other suitable hoist. When a lifting force is applied to the crane hook, the hook members swivel about in their ball and socket connections with the ball housings whereby they automatically align themselves with the slings 32. There is, therefore, no tendency to bend the hook members. Neither is there any possibility of bending the cap screws 27, as the large bearing surfaces 29 on the bottoms of the ball housings engaging the die effectually prevent such bending.

After the die is moved to its new location and set in place the hooks are readily removed by reversing the attaching procedure described above.

In case the shanks of the cap screws 27 do not fit the apertures 31 in the die, other cap screws, the threaded portions of the shanks of which are of the proper size and thread, may be employed. The heads of all cap screws and the unthreaded portions of the shanks thereof, must, of course, fit the recesses 25 and apertures 28 respectively.

The ball shaped boss 14 on the under side of the ball end 13 of the hook member is so fashioned that it nearly engages the head 26 of the cap screw, thereby holding the ball end of the hook member up into its socket.

From the foregoing it will be seen that the present invention provides a novel die hook of relatively simple construction that is attachable to a wide variety of dies or other articles of a similar nature. It is easily attached to and detached from a die, and it eliminates bending of the hook and the attaching cap screw.

The scope of the invention is indicated in the appended claims.

I claim:

1. A hook for use with hoisting apparatus including a hook member having a ball end and a shank portion extending therefrom, a ball housing receiving said ball end, the said ball end and housing being connected together for limited relative universal movement thereof, said ball end being provided with a projection extending outwardly from the surface thereof, said housing having a recess in its inner surface to receive said projection in a predetermined relative position of said ball end to prevent relative rotation of said hook member and housing.

2. A hook for use with hoisting apparatus including a hook member having a generally hemispherical end, a housing for said end comprising a socket section and an attaching section detachably secured together, said socket section having a socket receiving said hemispherical end for relative universal movement, said hemispherical end having a projection extending outwardly from the exterior surface thereof, said attaching section having a recess adapted to receive said projection in a predetermined relative position of said hemispherical end and said housing to prevent relative rotation of said hook member and said housing.

ROBERT W. SCHLEICHER.

REFERENCES CITED

The following references are of record in the file of this patent:

UNITED STATES PATENTS

| Number | Name | Date |
|---|---|---|
| 1,002,875 | Schnoor | Sept. 12, 1911 |
| 1,145,256 | Mochow et al. | July 6, 1915 |
| 1,701,683 | Leas | Feb. 12, 1929 |
| 1,762,439 | Hodgkins | June 10, 1930 |